No. 773,959. PATENTED NOV. 1, 1904.
R. A. MEISSNER.
SLEIGH RUNNER ATTACHMENT FOR BICYCLES.
APPLICATION FILED MAY 2, 1904.
NO MODEL.

Witnesses
Max B. A. Doring
Hattie B. Dieders

Inventor
Richard Adolf Meissner
By his Attorney
L. K. Böhm

No. 773,959. Patented November 1, 1904.

UNITED STATES PATENT OFFICE.

RICHARD ADOLF MEISSNER, OF HOBOKEN, NEW JERSEY.

SLEIGH-RUNNER ATTACHMENT FOR BICYCLES.

SPECIFICATION forming part of Letters Patent No. 773,959, dated November 1, 1904.

Application filed May 2, 1904. Serial No. 205,888. (No model.)

*To all whom it may concern:*

Be it known that I, RICHARD ADOLF MEISSNER, a subject of the German Emperor, and a resident of Hoboken, county of Hudson, and State of New Jersey, have invented certain new and useful Improvements in Sleigh-Runner Attachments for Bicycles, of which the following is a specification.

This invention has reference to sleigh-runner attachments for bicycles.

It is the special object of this invention to provide a sleigh-runner attachment for bicycles which is plain in construction, cheaply manufactured, and easily attached to the bicycle and removed therefrom.

Heretofore sleigh-runner attachments for bicycles have been constructed which are very complicated and expensive, and therefore not within the reach of everybody. Such devices are not quickly attached and removed from the bicycle and cost considerable when repairs must be made.

My device, further, is very durable, owing to its simple construction and the limited number of elements composing same.

The feature of easily attaching and removing the sleigh-runner attachment is very desirable when the rider passes, say, first through the streets of a city where the snow has been removed and then reaches ground where there is snow and ice.

The relatively light weight of my novel device makes it easy to carry the attachment when removed from the bicycle.

The invention is illustrated in the accompanying drawings, in which—

Figure 1:
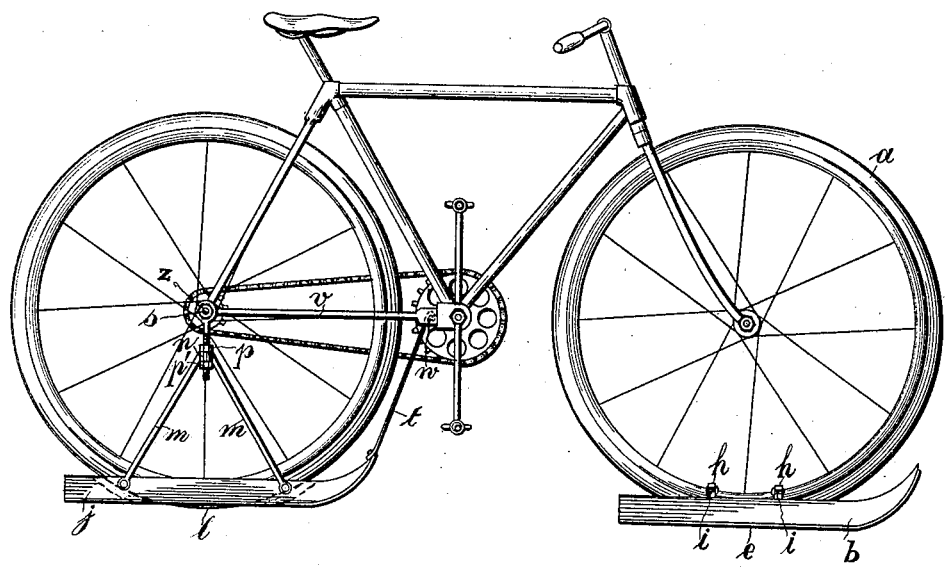
Figure 2:
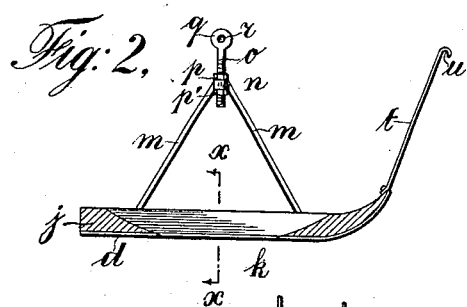
Figure 3:
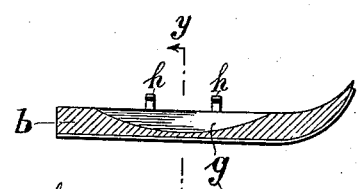
Figure 4:
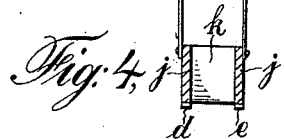
Figure 5:
Figure 6:
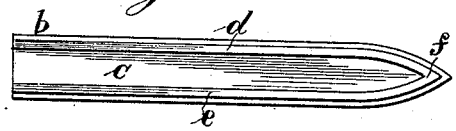

Figure 1 represents a bicycle with my sleigh-runner attachment applied. Fig. 2 shows a longitudinal section of a sleigh-runner attachment for the rear wheel of the bicycle. Fig. 3 illustrates in longitudinal section the sleigh-runner attachment for the front wheel of the bicycle. Fig. 4 is a cross-section on line $x\ x$ of Fig. 2. Fig. 5 is a cross-section on line $y\ y$ of Fig. 3, and Fig. 6 is a bottom view.

Similar characters of reference denote like parts in all the figures.

In the drawings, $a$ represents the front wheel of the bicycle, and $b$ the runner for the front wheel. The wooden portion of this runner has an uninterrupted bottom surface $c$, Fig. 6. Two iron strips $d\ e$ are permanently fixed to the bottom wooden surface $c$ and welded together in the front, as shown at $f$. The interior top portion of the front runner $b$ is cut out for the purpose of receiving the tire of the front wheel, as shown in Fig. 3. This opening or channel $g$ is of circular shape, like the tire, but is somewhat reduced in diameter at the top, as shown in Fig. 5. This shape of the channel $g$ is very practical, because it alone secures the tire therein. If necessary for mounting the front runner on the front wheel, the rider may allow some air to pass out of the tire, so as to insert same conveniently in the tire. After inserting the tire the rider simply pumps air therein for the purpose of hardening same. The channel $g$ is of segmental shape, as shown in Fig. 3, so as to fit the shape of the tire. For the purpose of further securing the front runner to the front wheel I have provided two hooks $h$ and two catches $i$, as shown in Fig. 1 and in detail in Fig. 5. After the tire has been inserted and pumped up the hooks and catches are simply engaged, which is done in a moment.

The rear runner $j$ is of similar shape as the front runner. However, its channel $k$ passes right through the wooden portion, so that when it is attached to the rear wheel the bottom portion $l$ of the tire rests on the ground. It is likewise provided with two metal strips $d\ e$, welded together in the front. In order to tightly secure the rear runner, there are two metal rods or bars $m$ on each side of same, as shown in Figs. 1 and 2. These converge toward each other, and where they meet an enlarged portion $n$ has been formed integral therewith. This enlarged top piece $n$ has an opening through which passes a threaded rod $o$, provided with a screw-nut $p$ above the top piece $n$ and a screw-nut $p'$ below same, constituting an adjusting device. The top end of the threaded rod $o$ is enlarged, forming a flange $q$, which has an opening $r$ fitting thus on the shaft $s$ on the rear wheel of the bicycle. As stated, two devices of this kind are provided on the rear runner, one being secured on each side of the rear wheel. The curved front end of the rear runner further has attached thereto a metal rod or bar *t*, having a hook *u* at its top end. The bar *v*, located between the sprocket-wheels of bicycles, is in this instance provided with an opening *w* near the front sprocket-wheel. When it is desired to attach the rear runner, then the nuts *z* are taken off and the rear wheel inserted into the runner. Now the flanges *q* are attached to the shaft *s*, and the nut *z* is then screwed on. After this the bar or rod *t* is hooked into the opening *w* on the bar *v*. By means of the nuts *p p'* the rear runner may now be adjusted in the proper manner.

It is plainly seen that the rider of the bicycle by working the pedals will revolve the rear wheel, whose lower portion *l* moves on the ground, thereby propelling the bicycle and effecting locomotion. The sleigh-runner attachments will then move forward at any desired speed. When the rider works the pedals leisurely, then the speed is less than when the pedals are worked quickly.

In the described manner a sleigh-runner attachment is produced which is plain in construction, cheaply manufactured, and easily attached to the bicycle, and removed therefrom.

Having thus described my invention, I claim as new and desire to secure by Letters Patent—

1. A sleigh-runner attachment for bicycles, consisting of a front runner, a segmental channel therein of circular cross-section like the tire, a top opening of somewhat smaller diameter in said channel extending through its entire length and allowing the tire to pass through when flat, and a rear runner having a segmental channel in its center extending through its entire body, and means for securing said runner to the rear wheel.

2. A sleigh-runner attachment for bicycles, consisting of a front runner, a circular segmental channel therein having a top opening somewhat reduced in diameter, making thus the front runner adapted to receive the tire when flat, and two clamping devices secured to its top portion, and a rear runner, a segmental channel in its center extending through the entire body of same, and means for securing this runner to the rear wheel.

3. A sleigh-runner attachment for bicycles, consisting of a front runner, a circular segmental channel therein having a top opening somewhat reduced in diameter, making thus the front runner adapted to receive the tire when flat, two iron strips on its bottom surface welded together in the front, and two clamps secured on its top portion, and a rear runner, a segmental channel in its center extending through the entire body of same, two iron strips on its bottom surface welded together in the front, converging braces on each side, an adjusting device secured in the top portion of said braces, and means for attaching this runner to the rear wheel.

4. A sleigh-runner attachment for bicycles, consisting of a front runner, a circular segmental channel therein having a top opening somewhat reduced in width, making thus the front runner adapted to receive the tire when flat, two iron strips on its bottom surface welded together in the front, and two clamps secured on its top portion, and a rear runner, a segmental channel in its center extending through the entire body of same, two iron strips on its bottom surface welded together in the front, converging brace rods or bars, an adjusting device in the top portion of same where they meet, a brace secured to the curved front end of the runner, and means for securing this runner to the rear wheel.

5. A sleigh-runner attachment for bicycles, consisting of a front runner, a circular segmental channel therein having a top opening somewhat reduced in width, making thus the front runner adapted to receive the tire when flat, two iron strips on its bottom surface welded together in the front, and two clamps secured on its top portion, and a rear runner, a segmental channel in its center extending through the entire body of same, two iron strips on its bottom surface welded together in the front, two converging brace rods or bars on each side forming an enlarged portion where they meet, an opening in said enlarged portion, a threaded rod therein, one screw-nut on said rod above and one below said enlarged portion of the brace-rods, a flange with opening on the top of the threaded rod, and a brace rod or bar with hook secured to the curved front end of the runner.

6. In a sleigh-runner attachment for bicycles, a front runner, a segmental channel therein of circular cross-section like the tire, a top opening of somewhat smaller diameter in said channel extending through its entire length allowing the tire to pass through when flat, two clamps secured to the top portion of the runner and two metal strips on the bottom surface of same welded together in the front.

7. In a sleigh-runner attachment for bicycles, a rear runner, a segmental channel in its center extending through the entire body of same, two iron strips on the bottom surface of the runner welded together in the front, two converging brace-rods on each side forming an enlarged portion where they meet, an opening in said enlarged portion, a threaded rod in said opening, one screw-nut above and one below said enlarged portion of the brace-rods, a flange with opening formed at the top of the threaded rod, and a brace with hook secured to the top front end of the runner.

Signed at New York, N. Y., this 30th day of April, 1904.

RICHARD ADOLF MEISSNER.

Witnesses:
  LUDWIG K. BÖHM,
  NICHOLAS CELIA.